Nov. 2, 1971  M. KANTOLA  3,616,825
MACHINE FOR HANDLING TIMBER
Filed May 12, 1970

INVENTOR:
M. Kantola
BY
Richards & Geier
ATTORNEYS

United States Patent Office 3,616,825
Patented Nov. 2, 1971

3,616,825
MACHINE FOR HANDLING TIMER
Mikko Kantola, Haukilahti 5, Finland
Filed May 12, 1970, Ser. No. 36,512
Int. Cl. A01g *23/02*
U.S. Cl. 144—3 D          5 Claims

ABSTRACT OF THE DISCLOSURE

A machine for handling timber has a tree-hauling jib which is mounted on a tractor or similar vehicle and can be turned in vertical and horizontal planes. The jib has a gripping element for grasping the tree. The machine also includes a trimming device provided with timber-handling equipment which is also mounted on a suitable vehicle and can be turned in vertical and horizontal planes. The characteristic feature of this invention consists in that the machine also includes a feeding jib provided with a claw for gripping trees to be trimmed and adapted to be turned in vertical and horizontal planes. The machine operates in that the hauling jib presents the tree to the feeding jib and the tree can be moved into the gripping elements of the trimming device with the use of the feeding jib.

---

Figure 1:
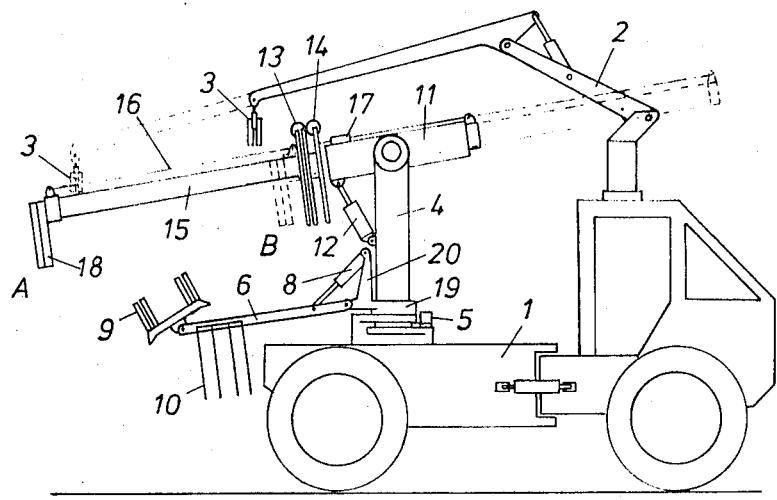

The present invention concerns a machine for handling timber, consisting of a hauling jib mounted on a tractor or other transporting chassis and turnable in the vertical and horizontal planes and which has a grab element for grasping the felled tree, and in addition of a trimming devices provided with timber handling equipment and which has been mounted on the transporting chassis to be turnable in the vertical and horizontal planes. In prior art there are many kinds of timber handling machines of this type. However, all these have the essential feature that the elements for performing various work phases have been dependent on each other's action, whereby transfer of the tree from one handling element to another has caused delay, with resulting reduction of the output of the machine. In particular, the handling of small trees with the aid of machines belonging to prior art has been expensive as calculated per unit volume of timber.

The aim of the present invention is to accomplish a timber handling machine which eliminates the above-mentioned drawbacks. Accordingly, the invention is mainly characterized in that a timber handling machine of said kind comprises, in addition, a feeding jib, with gripping claw, for the trees to be trimmed, which is turnable in the vertical and horizontal planes and which has been so placed that the tree conveyed to it by said hauling jib can be transferred into the gripping elements of the trimming device. Thanks to a tree feeding jib according to the invention, the operation of the hauling jib is not restricted by that of the trimming device because the hauling jib has thus been liberated from participation in trimming the tree or from waiting until the trimming device has trimmed the preceding tree. If the trimming device has not finished trimming the preceding tree by the time when the hauling jib presents another tree, the hauling jib may deliver the tree to the feeding jib according to the invention, whereby the hauling jib may become free immediately to go after another tree. The trimming device may also at the final phase of the handling of one tree be turned to parallel the feeding jib, and thus to parallel the next tree in turn to be trimmed, whereby the trimming and gripping element of the trimming device immediately on becoming free may grip the tree to be trimmed and perform the trimming, which most appropriately proceeds by steps, if the trimming device has moreover been provided with a crosscutting device. It is thus possible with a timber handling machine according to the invention to perform simultaneously various work phases, whereby the capacity of the machine may be utilized better than before. The tree-feeding jib may be provided with downwardly directed arms, or so-called clearing fingers, in which instance it is possible by turning the said feeding jib to push aside the branches that have been accumulated beside the machine. If required, it is possible to mount on the end of the hauling jib e.g. a hydraulically functioning device for felling growing trees. When merely a gripping element is used on the end of the hauling jib, a tree-top lopping device may be constructed in connection either with the gripping element or with the trimming device. On the side of the trimming and lopping device one may mount a bolt-collecting pocket, from which the pieces of timber may be deposited in piles on the side of the machine from time to time. The machine may also be provided with elements performing barking. The feeding jib consists of an arm pivoted turnably to the body of the machine and to one end of which a gripping claw has been turnably pivoted, and said arm has by means of a hydraulically or pneumatically operating cylinder been connected to the body so that the arm can be turned in the vertical and horizontal planes. The other details of the invention will be understood by the subsequent description of the invention, with reference to the embodiment presented in the attached drawing.

Figure 2:
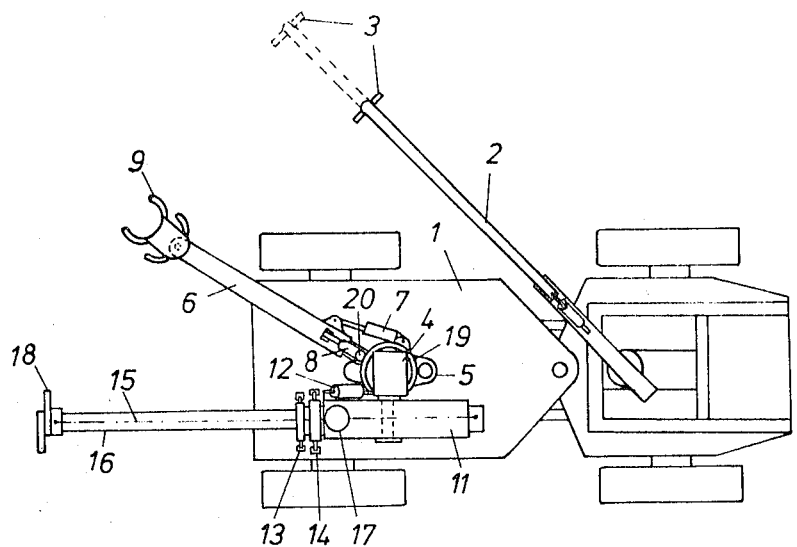

In the drawing, FIG. 1 shows a timber-handling machine according to the invention, seen from one side. FIG. 2 shows the same machine, seen from above.

This machine for handling timber comprises, mounted on a movable chassis 1, which may be a forestry tractor or equivalent vehicle able to negotiate roadless terrain, a hauling jib 2 belonging to prior art, which is turnable in the vertical and horizontal planes and which can be lengthened and shortened. In the drawing, it consists of an articulated jib, but it may also be of telescopic type. To the end of the jib there has been turnably pivoted a gripping element 3 of a type belonging to prior art, by which it is possible to grap the felled tree and transfer it to the desired point. On the said chassis there has been mounted the body 4 of a trimming device provided with timber handling equipment, which body may be turned about its vertical axis e.g. with the aid of a hydraulic motor 5. To the said body there has been pivotally attached a sleeve-like frame 11, which is connected by a hydraulic cylinder 12 to said body 4 for the purpose of turning the frame 11 in the vertical plane. To the front end of the frame 11 there has been attached a tree grasping element 13, which may be of any model belonging to prior art, and a timber cross-cutting element 14. Moreover, a trimming jib 15 has been mounted in the said frame 11. This jib has been arranged to be movable in the direction of its longitudinal axis in said frame 11. For moving the said trimming jib 15 from one extreme position to the other, it has been provided with a chain 16, the ends of which have been attached to the ends of the trimming jib. In the said frame 11 a hydraulic motor 17 has been mounted, with its sprocket wheel engaging with the chain 16 and thus able to move the trimming jib 15. On the front end of the trimming jib 15 a trimming and gripping element 18 of a design in itself belonging to prior art has been mounted.

The tree-handling device further comprises a feeding jib 6 for transferring the trees to be trimmed to the trimming device. The feeding jib 6 has been attached by one end pivotally to a sleeve-like part 19 arranged to be turnable about the lower part of the body 4. For turning the feeding jib in the vertical plane, said feeding jib has been connected by hydraulic cylinders 8 with a vertical arm 20 on said sleeve-like part 19. Furthermore, the feeding jib has been connected by hydraulic cylinder 7 to the said sleeve-like part 19, for the purpose of turning the feeding jib in the horizontal plane. The feeding jib 6 may also be such design that it can be lengthened and shortened.

The free end of the feeding jib 6 has been provided with a gripping claw 9 for grasping the tree to be trimmed, and the gripping claw may be provided with trimming blades. The feeding jib 6 has moreover been provided with downwardly directed arms 10 for pushing the trimming waste aside. Handling of a tree takes place in that the desired tree is grasped with the gripping element 3 of the hauling jib 2 and the tree is drawn into the gripping claw 9 of the feeding jib 6, which has been turned to coincide with it in direction, so that the end of the tree is well beyond the gripping claw, and the gripping element 3 of the hauling jib 2 releases the tree into the claw 9 of the feeding jib 6. The hauling jib is now free to go after another tree. After the trimming jib 15 has been turned to parallel the tree in the feeding jib 6, and with its trimming and gripping element 18 in its rear position B, the feeding jib 6 is raised so that the tree can be positively gripped with the gripping element 13 of the trimming jib 15. At the same time the trimming and gripping element 18 of the trimming jib 15 is pressed around the tree, while the end still rests on the ground. In case the end of the tree placed in the claw of the feeding jib should not be far enough to meet the gripping element, the tree may be moved towards it with the aid of the trimming and gripping element 18. When the trimming jib 16 is then displaced forwardly into position A (shown with dotted lines), the trimming and gripping element 18 will cut the branches off. After the trimming jib 16 has arrived in position A, B trimming jib is shifted back into position B, whereby the trimming and gripping device shifts the tree along wth it, and the gripping device 13 once more engages the tree. The trimming jib 16 is then once more moved into position A, whereby again part of the length of the tree will be trimmed. The cross-cutting device 14 operates simultaneously with the trimming phase, lopping the tree off. The reciprocating movement of the trimming jib continues until the tree has been completely trimmed and cut up.

The invention is by no means confined merely to the embodiment presented in the forgoing; it may rather be modified in various ways while still within the scope of the invention. It is merely essential that the timber-handling equipment includes a feeding jib.

I claim:
1. Machine for handling timber, consisting of a tree-hauling jib (2) mounted on a tractor or other transporting chassis and turnable in the vertical and horizontal planes, which jib has a gripping element (3) for grasping the tree, and furthermore of a trimming device provided with timber-handling equipment, mounted on the transporting chassis and turnable in the vertical and horizontal planes, characterized in that the machine furthermore comprises a feeding jib (6) provided with a claw (9) for gripping the trees to be trimmed, mounted to be turnable in the vertical and horizontal planes, which jib has been so placed that the tree presented to it by the said hauling jib (2) can be moved into the gripping elements of the trimming device with the aid of the feeding jib.

2. Machine for handling timber according to claim 1, characterized in that the feeding jib (6) comprised in it has at one end been pivotally attached to a sleeve-like part (19) arranged to be turnable about the lower part of the body (4) of the trimming device and that the said feeding jib (6) has been connected, for the purpose of its turning in vertical plane, by means of a hydraulic cylinder or equivalent to the sleeve-like part (19) and, for the purpose of its turning in horizontal plane, by means of a hydraulic cylinder (7) to said sleeve-like part (19).

3. Machine for handling timber according to claim 1, characterized in that the feeding jib (6) has been provided with downwardly directed arms (10) for pushing the trimming waste aside.

4. Machine for handling timber according to claim 1, characterized in that the trimming jib is one which can be shortened and lengthened.

5. Machine for handling timber according to claim 1, characterized in that its feeding jib has been provided with trimming blades.

References Cited

UNITED STATES PATENTS

| 3,269,436 | 8/1966 | Moore | 144—3 D |
| 3,329,184 | 7/1967 | Longert | 144—3 D |
| 3,348,592 | 10/1967 | Winblad et al. | 144—3 D |
| 3,443,611 | 5/1969 | Jorgensen | 144—2 Z |
| 3,531,235 | 9/1970 | Boyd et al. | 144—2 Z |

GERALD A. DOST, Primary Examiner

U.S. Cl. X.R.

144—2 Z